(No Model.)
H. A. WILLS.
PROCESS OF CUTTING HORSESHOE NAILS.
No. 382,927. Patented May 15, 1888.
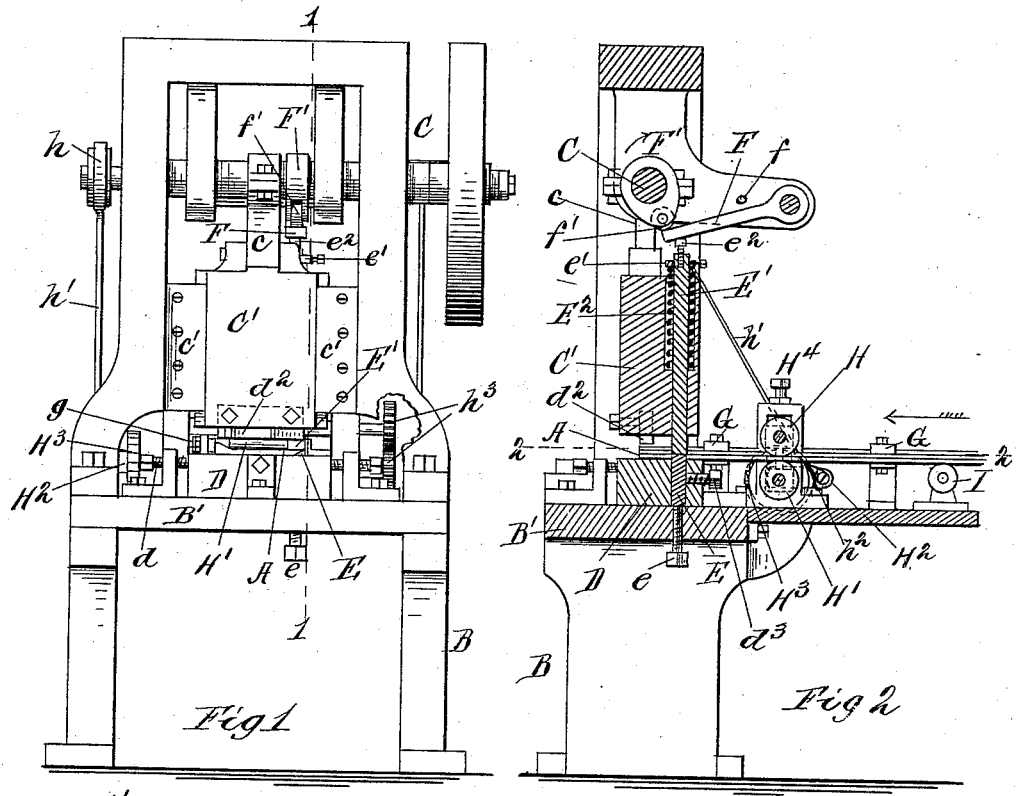
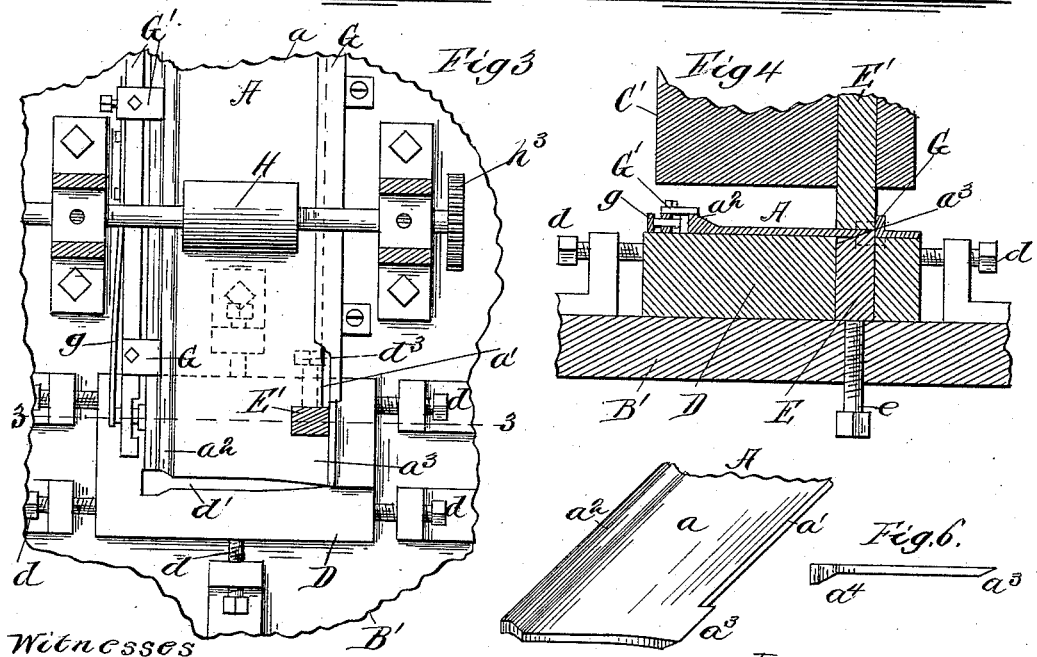
Witnesses
Inventor,
Harry A. Wills.

UNITED STATES PATENT OFFICE.

HARRY A. WILLS, OF CHICAGO, ILLINOIS.

PROCESS OF CUTTING HORSESHOE-NAILS.

SPECIFICATION forming part of Letters Patent No. 382,927, dated May 15, 1888.

Application filed May 12, 1887. Serial No. 237,987. (No model.)

*To all whom it may concern:*

Be it known that I, HARRY A. WILLS, a citizen of the United States, residing at Chicago, in the county of Cook and State of Illinois, have invented a certain new and useful Improvement in Processes of Cutting Horseshoe-Nails, which is fully set forth in the following specification, reference being had to the accompanying drawings, in which—

Figure 1 is an elevation of a machine adapted to be employed in carrying out my improved process; Fig. 2, a sectional view of the same, taken on the line 1 1 of Fig. 1; Fig. 3, a plan section taken on the line 2 2 of Fig. 2; Fig. 4, a detail sectional view taken on the line 3 3 of Fig. 3; Fig. 5, a detail perspective view of the bar after it has been operated upon, and Fig. 6 a detail view of a completed nail. Figs. 1 and 2 are on the same scale. Figs. 3, 4, 5, and 6 are on the same scale with respect to each other, but on an enlarged scale with respect to Figs. 1 and 2.

Like letters refer to like parts in all the figures of the drawings.

My invention relates to the art of cutting or punching horseshoe-nails from cold bars previously rolled in proper shape, and more particularly to an improved process to be employed in the manufacture of these nails.

I will now proceed to describe my improved process, and will then particularly point out in the claims those features which I deem to be new and desire to protect by Letters Patent.

In carrying out my process I operate upon a bar, A, which is fed forward intermittently to suitable dies, which first bevel one edge of said blank, preferably continuously, to form the bevel for the point of the nail, and then cut from the bar the finished nail. The bar A consists of a web portion, $a$, one edge of which, $a'$, is straight or of a thickness equal to the web portion, while the other edge is provided on the upper side of the bar with a rib, $a^2$, which forms the head of the finished nail. The edge $a'$ is first acted upon by a suitable pair of dies, which bevel the same, as shown at $a^3$, the bevel being preferably continuous and upon the under side, and the operation of the dies being such that the bevel-face is compressed and hardened, while at the same time the metal is elongated or drawn out at this point. After the bevel has been thus formed upon the bar it is subjected to the operation of suitable cutting-dies, which cut therefrom the finished nail.

I will now proceed to describe a machine which I prefer to employ in carrying out my improved process, it being understood, of course, that I do not limit myself to the use of this particular machine or any other in carrying out the said process, since it is obvious that the process is independent of the particular form of machine employed.

In its general features the machine which I have shown in the present instance is identical with the well-known form of stamping-press, consisting of a suitable frame, B, having a bed-plate, B', and a power-shaft, C, driven from any suitable source of power and provided with a pitman, $c$, mounted on a suitable crank or eccentric thereon and connected with a plunger, C', reciprocating in suitable vertical ways, $c'$. These parts are all well-known and are not of my invention. They may be constructed in any suitable manner, or any other approved form of mechanism may be substituted therefor.

D represents a die-block mounted upon the bed B' and adjustable thereon by means of suitable screws, $d$, to bring it into proper relative position with the die-plunger C'. This die-block D contains the female die, being provided with a suitably-shaped die-aperture, $d'$, conforming in its configuration to the shape of the finished nail, the said aperture $d'$ extending through the said block and through the bed B'. The die-plunger C' carries a male die, $d^2$, conforming in shape to the female-die aperture $d'$, and serving in conjunction with the same to cut from the bar A the finished nail. At a suitable point in advance of the cutting-dies $d'$ $d^2$ are arranged the beveling-dies E and E'. In the construction shown I have shown the female die E as arranged in the die-block D and capable of adjustment therein by means of a suitable screw, $e$, being secured after adjustment by means of a set-screw, $d^3$, while the male die, E', is mounted in the die-plunger C' and is capable of a vertical movement in the said plunger. On the upper end of the die E' is arranged a collar, $e'$, against which a spiral spring, $E^2$, bears, the said spring being arranged in a suitable recess in the die-plunger C', and serving to thrust the die E' normally upward. Any other suitable spring or weight may be employed for this purpose, although I prefer the form shown. When this form is employed, the collar $e'$ may be adjustable upon the die E', in order to adjust the tension of the spring $E^2$.

F represents a vibrating arm mounted upon a suitable bearing on the main frame B, and caused to vibrate by means of a cam, F', on the shaft C. A stop, $f$, is provided to limit the upward motion of the vibrating arm F, and the cam F' is preferably provided with a roller, $f'$, to lessen the friction due to the contact of the cam with the arm. The vibrating arm F rests upon the upper end of the die E', and serves to impart a vertically-reciprocating motion to the same. In the construction shown the upper end of the die E' is provided with an adjustable screw-bolt, $e^2$, upon the head of which the vibrating arm F bears, the said screw-bolt serving to take up wear, its operation to this end being obvious.

The bar A is arranged between lateral guides or supports G and G', and one of these guides, G', on that side opposite the side on which the beveling-dies are located, is capable of yielding laterally, for the purposes hereinafter described, being held up in position by a suitable spring or springs, $g$. The fixed guide G extends as far as the cutting-dies $d'$ $d^2$, and serves to gage the bar A by means of the beveled edge $a^3$ thereof during the operation of cutting therefrom the finished nail. Suitable feeding devices are provided to feed the bar A intermittently to the dies. Any approved form may be employed, that which I prefer consisting of two rollers, H and H', actuated by means of an eccentric, $h$, on the shaft C, said eccentric being provided with a rod, $h'$, which is pivoted to an oscillating arm, $H^2$, carrying a spring-pawl, $h^2$, which engages with a ratchet-wheel, $H^3$, on the shaft of one of the feed-rollers. The feed-rollers are connected by gears $h^3$, and the upper roller is adjustable by means of screws $H^4$. This feed mechanism is well known, and not of my invention, and any other approved form of feed mechanism may be substituted therefor. A supporting-roller, I, supports the outer end of the bar A, the inner end resting upon the die-block D in the manner shown more particularly in Fig. 2 of the drawings.

The machine thus organized operates to carry out my process in the following manner: The feed mechanism advances the bar A until it comes between the beveling-dies E and E', when the die E' descends and bevels the edge $a'$ of the bar A, forming the bevel portion $a^3$. (Shown in Fig. 5.) During this operation of beveling, the metal forming the bar A is elongated transversely, the fibers being drawn out at the point where the bevel is formed, and thereby compacted and hardened. The guide or support G', being a yielding support, permits the bar A to yield laterally away from the dies E and E' during the operation of beveling. The feed-rollers are so adjusted that they bear upon the bar with sufficient force to feed the same forward at the proper intervals; but their pressure upon the bar is not sufficient to prevent this lateral yielding of the bar. The bar A is then fed forward until it reaches the cutting-dies $d'$ $d^2$, which then operate on the bar and cut therefrom the finished nail. During this feeding forward of the bar to the cutting-dies its position is gaged by means of the beveled edge $a^3$ of the same, so that when it reaches the said cutting-dies the ends of the said dies which cut the point of the nail correspond exactly with the sharp edge formed at the termination of the bevel $a^3$ of the bar. If the position of the bar were gaged from the head side thereof, any variation in the width of the bar whereby a nail shorter than this width would be produced would result in the cutting of a nail with a blunt point, whereas by gaging the position of the bar from the beveled edge thereof the point of the nail will always coincide with the termination of the bevel, and each nail produced will have a sharp point. It will be observed that the rib $a^2$ is upon the upper side of the bar, whereas the bevel $a^3$ is upon the lower side of the bar. The die $d^2$ as it descends, first strikes the rib $a^2$ and forces the same down into the female die until on the upper side the said rib is level with the web portion $a$ of the bar. This flattening of the upper surface of the bar is due to the fact that the male die $d^2$ is flat upon its under surface, and that the female die $d'$ supports the bar on both sides of the die-aperture, so as to cause the bar to afford sufficient resistance to the descent of the male die to effectuate this preliminary flattening of the upper surface thereof. The forcing of the rib down level with the upper surface of the web portion of the bar causes a corresponding downward projection of the metal on the under side of the bar, which projection is forced into the female die and is the first portion of the metal composing the bar which enters the said die, and this projection forms on the under side of the bar A the head $a^4$ of the finished nail, so that as the operation of cutting the nail from the bar proceeds, when this operation is finished and the nail is completely severed from the bar, it will have the form shown in Fig. 6, with the head $a^4$ upon the same side of the nail as the bevel $a^3$ of the point.

It will be, of course, understood that the female beveling-die may be located above and the male beveling-die below the bar A, in which case this reversal of the head of the nail will be unnecessary, and the male cutting-die will then be so constructed as to conform to the shape of the upper side of the bar A, and thereby leave the head upon the same side as the bevel of the point. The parts are so timed that the beveling-dies operate just after the cutting-dies, and the former pair of dies are preferably located sufficiently in advance of the latter pair to bevel continuously beforehand a portion of the edge $a'$ of the bar A sufficient in length to provide material for the cutting of about three nails.

In practice, when the machine is in continuous operation, the die-plunger $C'$ first descends and cuts a nail from the bar A, and during the ascent of the said die-plunger the beveling-die $E'$ descends, bevels the edge of the bar, and ascends to its first position, thereby performing the entire operation of beveling during the ascent or withdrawal of the male cutting die.

It will be observed that although the operation of beveling is in itself intermittent, yet the bevel produced is a continuous bevel.

By reason of the process which I employ I obtain a nail in which the point is hardened or compressed by drawing out the metal thereof under compression without crushing the fibers of the metal and thus rendering the point defective. Moreover, it will be seen that operating upon a bar of the form described, and which is readily obtainable from manufacturers, I complete the process of manufacture of the nails in a single machine with one handling, so that each nail comes from the machine in a finished or perfect condition without entailing the necessity of any finishing operations thereon. Moreover, as the cutting-dies are of fixed dimensions, all the nails are exactly similar in shape, since each nail cut must conform to the shape of the cutting-dies.

It will be understood, of course, that the bar A is operated upon while cold, so that the compressing action of the dies serves to properly harden the metal.

One of the most advantageous features of allowing the bar to yield laterally while its edge is being beveled is that by this means upsetting of the metal at the termination of the bevel is avoided, its thickness not being increased at this point, owing to the fact that the bar is capable of yielding away from the dies, thus giving the dies a drawing action upon the metal instead of forcing it outward and upward from the body of the metal and thereby upsetting it.

It is obvious that various modifications in the details of the invention may be made without departing from the principle thereof. It is also obvious that other mechanism than that set forth may be employed in carrying out the process described, and I therefore do not wish to be understood as limiting myself strictly to the details hereinbefore set forth or to the precise construction shown in the drawings.

I make no claim in the present application to the apparatus shown and described, as the same forms the subject-matter of a separate application.

Having thus described my invention, what I claim as new, and desire to secure by Letters Patent, is—

1. The herein-described process of making horseshoe-nails, which consists in forming a bevel upon one side of the point edge of a suitably-rolled bar and then punching the nails successively from the said bar, both operations being performed as the bar is fed along through a single machine, substantially as and for the purpose specified.

2. The hereinbefore-described process of making horseshoe-nails by a continuous operation, which consists in alternately first beveling the point edge of a portion of the bar and then cutting from the beveled portion the finished nail, and repeating these operations, substantially as and for the purposes specified.

3. The hereinbefore-described process of making horseshoe-nails, which consists in first beveling the point edge of a portion of the bar and then forcing the bar backward so as to produce a drawing action on the point by the pressure of the beveling-dies, and then cutting from the beveled bar the finished nail, substantially as and for the purposes specified.

4. The herein-described process of making horseshoe-nails in a continuous operation, which consists in gradually beveling the point edge of a suitably-formed bar, gaging the position of the said bar for the cutting-dies from the said beveled edge, and then cutting the nails successively from the said bar while thus gaged, substantially as and for the purposes specified.

HARRY A. WILLS.

Witnesses:
W. C. CORLIES,
A. M. BEST.